(12) United States Patent
Jiang et al.

(10) Patent No.: US 6,819,694 B2
(45) Date of Patent: Nov. 16, 2004

(54) RESONANT FABRY-PEROT SEMICONDUCTOR SATURABLE ABSORBERS AND TWO PHOTON ABSORPTION POWER LIMITERS

(75) Inventors: Min Jiang, Ann Arbor, MI (US); Donald J. Harter, Ann Arbor, MI (US); Gregg D. Sucha, Manchester, MI (US); Martin E. Fermann, Ann Arbor, MI (US)

(73) Assignee: Imra America, Inc., Ann Arbor, MI (US)

( * ) Notice: Subject to any disclaimer, the term of this patent is extended or adjusted under 35 U.S.C. 154(b) by 165 days.

(21) Appl. No.: 09/738,373

(22) Filed: Dec. 15, 2000

(65) Prior Publication Data

US 2001/0001006 A1 May 10, 2001

Related U.S. Application Data

(62) Division of application No. 09/149,368, filed on Sep. 8, 1998.

(51) Int. Cl.[7] ................................................ H01S 3/08
(52) U.S. Cl. ........................................................ 372/44
(58) Field of Search ............................................ 372/11

(56) References Cited

U.S. PATENT DOCUMENTS

| | | | |
|---|---|---|---|
| 4,435,809 A | | 3/1984 | Tsang et al. |
| 4,633,475 A | | 12/1986 | Samelson |
| 4,846,561 A | | 7/1989 | Soileau, Jr. et al. |
| 4,860,296 A | | 8/1989 | Chemla et al. |
| 5,067,134 A | * | 11/1991 | Oomen ............................ 372/6 |
| 5,226,049 A | * | 7/1993 | Grubb ............................. 372/6 |
| 5,237,577 A | | 8/1993 | Keller et al. |
| 5,278,855 A | * | 1/1994 | Jacobovitz-Veselka et al. .. 372/44 |
| 5,299,170 A | * | 3/1994 | Shibata et al. ............... 356/345 |
| 5,363,386 A | * | 11/1994 | Smith ............................. 372/6 |
| 5,422,897 A | * | 6/1995 | Wyatt et al. .................... 372/6 |
| 5,436,925 A | | 7/1995 | Lin et al. |
| 5,627,854 A | | 5/1997 | Knox |
| 5,659,558 A | * | 8/1997 | Tohmon et al. ................. 372/5 |
| 5,696,782 A | * | 12/1997 | Harter et al. .................. 372/25 |
| 5,701,327 A | | 12/1997 | Cunningham et al. |
| 5,774,484 A | * | 6/1998 | Wyatt et al. .................... 372/6 |
| 5,818,630 A | * | 10/1998 | Fermann et al. ......... 359/341.31 |
| 5,862,287 A | * | 1/1999 | Stock et al. ................. 385/123 |
| 5,880,877 A | * | 3/1999 | Fermann et al. ........ 359/341.31 |
| 6,188,705 B1 | * | 2/2001 | Krainak et al. ................ 372/32 |
| 6,249,630 B1 | * | 6/2001 | Stock et al. ................. 385/123 |
| 6,275,250 B1 | * | 8/2001 | Sanders et al. .............. 347/247 |
| 6,275,512 B1 | * | 8/2001 | Fermann ......................... 372/6 |
| 6,320,885 B1 | * | 11/2001 | Kawai et al. ................... 372/6 |
| 2001/0024458 A1 | * | 9/2001 | Fermann ......................... 372/6 |

OTHER PUBLICATIONS

Agnesi et al., Generation of Extended Pulse Trains of Minimum Duration by Passive Negative Feedback Applied to Solid–State Q–Switched Lasers, Mar. 1992, IEEE Journal of Quantum Electronics, vol. 28, No. 3, pp. 710–718.*

Hordvik, "Pulse Stretching Utilizing Two–Photon–Induced Light Absorption", IEEE Journal of Quantum Electronics, vol. QE–6, No. 4 Apr. 1970, pp. 199–203.

Haus, "Parameter Ranges for CW Passive Mode Locking", IEEE Journal of Quantum Electronics, vol. QE–12, No. 3, Mar. 1976, pp. 169–176.

(List continued on next page.)

Primary Examiner—Don Wong
(74) Attorney, Agent, or Firm—Knobbe Martens Olson & Bear LLP

(57) ABSTRACT

An intracavity resonant Fabry-Perot saturable absorber (R-FPSA) induces modelocking in a laser such as a fiber laser. An optical limiter such as a two photon absorber (TPA) can be used in conjunction with the R-FPSA, so that Q-switching is inhibited, resulting in laser output that is cw modelocked. By using both an R-FPSA and a TPA, the Q-switched modelocked behavior of a fiber laser is observed to evolve into cw modelocking.

8 Claims, 11 Drawing Sheets

OTHER PUBLICATIONS

Arsen'ev, et al., Nanosecond and microsecond pulse generation in solid–state lasers (review), *Sov. J. Quantum Electron*, 7(11), Nov. 1977, pp. 1321–1332.

Smith, et al., "Mode locking of semiconductor diode lasers using saturable excitonic nonlinearities", *J. Opt. Soc. Am. B.*, vol. 2, No. 7, Jul. 1985, pp. 1228–1236.

Van Stryland, et al., "Two photon absorption, nonlinear refraction, and optical limiting in semiconductors", *Optical Engineering*, vol. 24, No. 4, Jul./Aug. 1985, pp. 613–623.

Van Stryland, et al., "Energy band–gap dependence of two–photon absorption", *Optical Society of America*, vol. 10, No. 10, Oct. 1985, pp. 490–492.

Van Stryland, et al., "Optical limiting with semiconductors", *J. Opt. Soc. Am. B.*, vol. 5, No. 9, Sep. 1988, pp. 1980–1989.

Islam, et al., "Color Center Lasers Passively Mode Locked by Quantum Wells", *IEEE Journal of Quantum Electronics*, vol. 25, No. 12, Dec. 1989, pp. 2454–2462.

Ippen, et al., "Self–starting condition for additive–pulse mode–locked lasers", *Optics Letters*, vol. 15, No. 3, Feb. 1, 1990, pp. 183, 185.

Soccolich, et al., "Bulk semiconductor saturable absorber for a NaCI color center laser", *Appl. Phys. Lett.*, 56 (22), May 28, 1990, pp. 2177–2179.

Como, et al., "Active–passive mode–locked Nd:YAG laser with passive negative feedback", *Optics Letters*; vol. 15, No. 13, Jul. 1, 1990, pp. 734–736.

Keller, et al., "Solid–state low–loss intracavity saturable absorber for Nd:YLF lasers: an antiresonant semiconductor Fabry–Perot saturable absorber", *Optics Letters*, vol. 17, No. 7, Apr. 1, 1992, pp. 505–507.

Agnesi, et al., "Passive negative feedback in mode–locked solid–state lasers", *Optics Letters*, vol. 18, No. 8, Apr. 15, 1993, pp. 637–639.

Fermann, et al., "Environmentally stable Kerr–type mode–locked erbium fiber laser producing 360–fs pulses", *Optics Letters*, vol. 19, No. 1, Jan. 1, 1994, pp. 43–45.

Hudgings, et al., "Frequency tuning of self–pulsations in a VCSEL with a voltage–controlled saturable absorber", *OFC '98 Technical Digest*, pp. 10–11.

Barnett, et al., "High–power erbium–doped fiber laser mode locked by a semiconductor saturable absorber", *Opticts Letters*, vol. 20, No. 5, Mar. 1, 1995, pp. 471–473.

Tsuda, et al., "Low–loss intracavity AIAs/AIGaAs Bragg reflector for femtosecond mode locking in solid–state lasers", *Optics Letters*, vol. 20, No. 12, Jun. 15, 1995, pp. 1406–1408.

Ober, et al., "Widely tunable femtosecond neodymium fiber laser", *Optics Letters*, vol. 20, No. 22, Nov. 15, 1995, pp. 2303–2305.

Kajava, et al., "Q Switching of a diode–pumped Nd:YAG laser with GaAs", *Optics Letters*, vol. 21, No. 16, Aug. 15, 1996, pp. 1244–1246.

Keller, et al., "Semiconductor Saturable Absorber Mirrors (SESAM's) for Femtosecond to Nanosecond Pulse Generation in Solid–State Lasers", *IEEE Journal of Selected Topics in Quantum Electronics*, vol. 2, No. 3, Sep. 1996, pp. 435–453.

Obeidat, et al., "Effects of two–photon absorption in saturable Bragg reflectors in femtosecond solid–state lasers", *CLEO '97/Tuesday Afternoon*, pp. 130–131.

Wood, "Laser Damage in Optical Materials".

* cited by examiner

_US 6,819,694 B2_

RESONANT FABRY-PEROT SEMICONDUCTOR SATURABLE ABSORBERS AND TWO PHOTON ABSORPTION POWER LIMITERS

This is a Divisional Application of U.S. Application No. 09/149,368, filed Sep. 8, 1998.

BACKGROUND OF THE INVENTION

1. Field of the Invention

The present invention relates generally to modelocking, and in particular, to cw modelocking in which Q-switched pulses are suppressed.

2. Description of the Related Art

Semiconductor saturable absorbers have recently found application in the field of passively modelocked, ultrashort pulse lasers. These devices are attractive since they are compact, inexpensive, and can be tailored to a wide range of laser wavelengths and pulsewidths. Semiconductor saturable absorbers were first used to passively modelock a diode laser (see P. W. Smith, Y. Silberberg and D. B. A. Miller, "Mode locking of semiconductor diode lasers using saturable excitonic nonlinearities," J. Opt. Soc. Am. B, vol. 2, pp. 1228–1236, 1985 and U.S. Pat. No. 4,435,809 to Tsang et al). Quantum well and bulk semiconductor saturable absorbers have also been used to modelock color center (M. N. Islam, E. R. Sunderman, C. E. Soccolich, I. Bar-Joseph, N. Sauer, and T. Y. Chang, "Color center lasers passively mode-locked by quantum wells", IEEE J. of Quantum Electronics, vol. 25, pp. 2454–2462 (1989)) and fiber lasers (U.S. Pat. No. 5,436,925 to Lin et al.).

A saturable absorber has an intensity-dependent loss l. The single pass loss of a signal of intensity I through a saturable absorber of thickness d may be expressed as $$l = 1 - \exp(-\alpha d) \quad (1)$$

in which $\alpha$ is the intensity dependent absorption coefficient given by:

$$\alpha(I) = \alpha_0 / (1 + I/I_{SAT}) \quad (2)$$

Here $\alpha_0$ is the small signal absorption coefficient, which depends upon the material in question. $I_{SAT}$ is the saturation intensity, which is inversely proportional to the lifetime ($\tau_A$) of the absorbing species within the saturable absorber. Thus, saturable absorbers exhibit less loss at higher intensity.

Because the loss of a saturable absorber is intensity dependent, the pulse width of the laser pulses is shortened as they pass through the saturable absorber. How rapidly the pulse width of the laser pulses is shortened is proportional to $|dq_0/dI|$, in which $q_0$ is the nonlinear loss:

$$q_0 = l(I) - l(I=0) \quad (3)$$

$l(I=0)$ is a constant ($=1-\exp(-\alpha_0 d)$) and is known as the insertion loss. As defined herein, the nonlinear loss $q_0$ of a saturable absorber decreases (becomes more negative) with increasing intensity I. $|dq_0 dI|$ stays essentially constant until I approaches $I_{SAT}$, becoming essentially zero in the bleaching regime, i.e., when $I>>I_{SAT}$.

For a saturable absorber to function satisfactorily as a modelocking element, it should have a lifetime (i.e., the lifetime of the upper state of the absorbing species), insertion loss l(I=0), and nonlinear loss $q_0$ appropriate to the laser. Ideally, the insertion loss should be low to enhance the laser's efficiency, whereas the lifetime and the nonlinear loss $q_0$ should permit self-starting and stable cw modelocking. The saturable absorber's characteristics, as well as laser cavity parameters such as output coupling fraction, residual loss, and lifetime of the gain medium, all play a role in the evolution of a laser from startup to modelocking.

To obtain rapid pulse shortening in a self-starting cw modelocked laser having a saturable absorber, the intensity on the saturable absorber should be high and the absorber should have a nonlinear loss $q_0$ whose magnitude is large. On the other hand, reducing the loss of the saturable absorber causes the intracavity power to increase, which may lead to gain saturation. If the gain saturation does not dampen power increases caused by the large magnitude of the nonlinear loss $q_0$, the laser will operate in a regime in which the laser Q-switches and modelocks simultaneously (see H. A. Haus, "Parameter range for cw passive mode locking," IEEE, J. Quantum Electronics, QE-12, p. 169, 1976). This is particularly true for a laser medium with a very long lifetime such as an erbium-doped. fiber ($\tau \sim ms$). Thus, to avoid Q-switching, the magnitude of the nonlinear loss $q_0$ of the saturable absorber must be limited, but not to the point where self-starting of the modelocking becomes difficult. The insertion loss and the nonlinear loss $q_0$ of a semiconductor saturable absorber can be controlled by selecting a material having the appropriate band gap and thickness.

The loss characteristics of a simple saturable absorber may be modified by the Fabry-Perot interference effect. Indeed, semiconductor saturable absorbers tend to form a natural Fabry-Perot structure since a semiconductor's relatively high index of refraction (typically 2–4) results in a semiconductor-air interface from which ~10–40% of the incident light may be reflected. A semiconductor saturable absorber may have one side that is high reflection coated (e.g., for maximum reflectivity), with this high reflector forming one end of a laser cavity. In this case, the fraction $R_{F-P}$ of the intracavity power that is reflected from the semiconductor saturable absorber is given by $$R_{F-P} = 1 - (1-R)(1-T)[1 + RT + 2(RT)^{1/2} \cos(2\delta)]^{-1} \quad (4)$$

in which R is the front surface reflectivity of the saturable absorber (i.e., the reflectivity of the saturable absorber and any reflection coating thereon in the absence of reflection from the back side), $\delta = (2nd/\lambda)2\pi$ is the double pass phase change, d is the sample thickness, n is the index of refraction, and $\lambda$ is the wavelength of interest. T is the double pass transmission through the saturable absorber and is equal to $\exp(-2\alpha d)$, with $\alpha$ being the absorption coefficient of the material. The corresponding absorption is then $A = 1 - T = 1 - \exp(-2\alpha d)$. If multiple layers with different indices of refraction and absorption coefficients are used as part of the Fabry-Perot etalon, equation (4) must be modified so that the double pass phase change and the absorption are summed over all the layers.

The fraction of the laser cavity power incident on the Fabry-Perot structure that is absorbed in the saturable absorber ($F_{ABS}$) is in general not simply 1–T, but rather $1 - R_{F-P}$. This is due to the fact that a Fabry-Perot structure acts as a resonating structure, in which power may circulate before reentering the rest of the laser cavity.

According to equation (4), $R_{F-P}$ (the fraction of the intracavity standing power reflected from a semiconductor saturable absorber) is a sensitive function of the double pass phase change $\delta$, which depends upon the laser wavelength as well as the thickness and index of refraction of the saturable absorber. As illustrated in FIG. 1, for a given laser wavelength $\lambda$ and index of refraction n, the reflectivity of a Fabry-Perot device is a periodic function that depends upon the thickness d of the saturable absorber. If the thickness of the Fabry-Perot device is chosen to be d=λm/2n, in which m is a positive integer, the double pass phase change is δ=2mπ, and the Fabry-Perot device is said to be at antiresonance. In this case, $R_{F-P}=1-(1-R)(1-T)[1+(RT)^{1/2}]^{-2}$.

In addition to wavelength and thickness, $R_{F-P}$ can also be viewed as a function of R. FIG. 2 considers how $R_{F-P}$ varies as a function of R and wavelength λ for a given saturable absorber thickness d. In particular, the higher R is, the more rapidly $R_{F-P}$ varies. When R=0 (i.e., when the surface of the saturable absorber that faces the gain medium is anti-reflection coated), $R_{F-P}=T$ and thus depends solely upon the absorption of the saturable absorber. For a Fabry-Perot intracavity saturable absorber with a highly reflecting back surface such as that considered here, it is often desirable to avoid the "etaloning" effect altogether by anti-reflection coating the surface facing the gain medium.

In general, however, R≠0, and by choosing d and R appropriately, the loss of a Fabry-Perot saturable absorber can be effectively controlled. If the thickness of the saturable absorber is chosen to be a multiple integer of $$\frac{\lambda}{2n},$$

the device is said to be an anti-resonant Fabry-Perot saturable absorber (A-FPSA) see U. Keller et al., "Solid-state low-loss intracavity saturable absorber for Nd:YLF lasers: an antiresonant semiconductor Fabry-Perot saturable absorber," Opt. Lett., vol. 17, p. 505, 1992 and U.S. Pat. No. 5,237,577 to Keller et al.) In an A-FPSA, the side of the device facing the gain medium usually includes a high reflector. In this configuration, most of the incident light is reflected from the gain-medium-facing surface and little goes into the saturable absorber, thus reducing the light absorbed by the saturable absorber. This low absorption design is appropriate for lasers with small output coupling and low single pass gain, such as solid state lasers. For example, if the laser has an output coupler of ~4%, an insertion loss of nearly 0.5% may be desirable, which is lower than what is normally obtained from either a quantum well or bulk absorber semiconductor. Low loss A-FPSA devices have been used successfully in modelocked solid-state lasers (see, for example, U. Keller, D. A. B. Miller, G. D. Boyd, T. H. Chiu, J. F. Ferguson, and M. T. Asom, "Solid-state low-loss intracavity saturable absorber for Nd:YLF lasers: an antiresonant semiconductor Fabry-Perot saturable absorber," Opt. Lett., 17, 505, 1992).

Other low loss designs have been successfully used in modelocking arrangements. For example, a quantum well saturable absorber can be inserted into a Semiconductor Bragg Reflector (SBR) (see U.S. Pat. No. 5,627,854 to Knox and also S. Tsuda, W. H. Knox, E. A. de Souza, W. Y. Jan, and J. E. Cunningham, "Low-loss intracavity AlAs/AlGaAs saturable Bragg reflector for femto-second mode locking in solid state lasers," Opt. Lett., vol. 20, p. 1406, 1995). In this arrangement, light intensity decreases rapidly inside the SBR, and the insertion loss is controlled by precisely placing absorbing layers within the SBR.

Another means of manipulating the effective insertion and nonlinear losses is through appropriate positioning of the absorber in a standing wave. In this design, an incident beam is reflected by a high or partial reflector to form an intracavity standing wave in which the intensity varies between zero and twice the incident intensity. The insertion and nonlinear losses are controlled by appropriate positioning of absorbing layers within the standing wave electric field. In U.S. Pat. No. 5,701,327 to Cunningham et al., the quantum well absorption layers are inserted into a multiple half wavelength thick strain relief layer which is then deposited on top of an SBR Since the total thickness of the strain relief layer is a multiple integer of half wavelengths a standing wave node is formed (where the intensity is minimum) at the surface facing the incident beam. This antiresonant design limits the amount of light going into the strain relief layer and hence limits the amplitude of the standing wave.

In another design (see U.S. Pat. No. 4,860,296 to Chemla et al.), nonlinear loss is maximized by placing thin absorbing layers (separated by transparent spacers) at the antinodes of a standing wave to form a so called grating saturable absorber. By placing the absorbing layers at the antinodes, where the intensity is twice the average value, the nonlinear loss can be enhanced by up to a factor of 2 if the absorbing layers are very thin compared to the transparent spacers.

All of these prior art designs involve saturable absorbers having low insertion loss. Accordingly, the magnitude of the nonlinear loss is limited, being maximized when the saturable absorber is completely bleached. For a high gain, high output fiber laser, however, the magnitude of the nonlinear loss is preferably large for modelocking to be self-starting. On the other hand, the use of a highly nonlinear saturable absorber may lead to persistent Q-switching. Thus, there remains a need for saturable absorbers suitable for self-starting modelocking of high gain, high output lasers such as fiber lasers.

SUMMARY OF THE INVENTION

The method of achieving self-starting cw mode-locking evolving from Q-switched mode-locking (QSML) is disclosed. In contrast, the modelocking of most solid state lasers begins from cw noise.

The use of interactivity Resonant Fabry-perot Absorbers (R-FPSA) for inducing self-starting mode-locking in a laser is also disclosed. An optical power limiter such as a two photon absorber (TPA), e.g., a semiconductor material, is optionally used in the laser cavity to inhibit Q-switching. The R-FPSA is designed such that the nonlinear loss experienced by the saturable absorber is enhanced over the prior art A-FPSA configurations. The TPA power limiter provides effective damage protection for the R-FPSA and self-adjusts the total nonlinear loss of the laser to be in the stable cw mode-locking region.

The R-FPSA includes two reflectors having a spacing of roughly (2m+1)λ/4n. One reflector is preferably a maximum reflector that defines one end of the laser cavity (the "end reflector"), whereas the other reflector is formed by a high or partial reflector that faces the gain medium of the laser (the "inner reflector").

When the Fabry-Perot device has a thickness given by nd=(2m+1)λ/4, the double pass phase change is δ=(2m+1)π, and the Fabry-Perot structure is said to be at resonance. In this case, $R_{F-P}=1-(1-R)(1-T)[1-(RT)^{1/2}]^{-2}$ and is a minimum. By operating at resonance, the laser intensity absorbed by the saturable absorber is enhanced. The absorbed intensity for the R-FPSA is given by $I_{Abs}=(1-R_{F-P})I=(1-T)(1-R)/[1-(RT)^{1/2}]^2 I$, as can be determined from equation (4) with cos(2δ)=−1. This is to be compared with the case in which the front surface is anti-reflection coated (R=0) and $I_{ABS}=(1-T)I$. Thus, by operating the Fabry-Perot device at resonance, the intensity absorbed by the saturable absorber is increased by a factor of $(1-R)/[1-(RT)^{1/2}]^2$.

The effect of varying R on $R_{F-P}(\lambda)$ for an R-FPSA is illustrated in FIG. 2. The spacing between adjacent minima is given by $\Delta\lambda=\lambda_{m+1}-\lambda_m=\lambda_m\lambda_{m+1}/2nd$ and is preferably large for certain applications such as ultrafast lasers, where broad bandwidth is needed. The inner reflector should have a reflectivity R sufficiently high to provide a desired intensity on the saturable absorber. This reflectivity R, however, should not be so high that $R_{F-P}(\lambda)$ is no longer relatively flat over the gain profile. For example, if the inner reflector reflectivity R is too high, the bandwidth of $R_{F-P}(\lambda)$ at resonance needed for modelocked laser pulses may be too limited. For applications in which the spot size on the saturable absorber can not be varied (e.g., butt-coupling to a fiber or a waveguide), "tuning" the intensity on the absorber by selecting an appropriate R may be desirable.

The resonant effect on the nonlinear loss and $R_{F-P}$ as a function of wavelength is explored in FIG. 3. This figure shows that the nonlinear loss experiences a significant enhancement when the Fabry-Perot device is designed to be at resonance. The negative nonlinear loss is calculated as—$q=R_{F-P}(R,T)-R_{F-P}(R,T_0)$. Where $T=\exp(-2\alpha d)=T_0\exp(-2(\delta\alpha)d)\sim T_0(1-2(\delta\alpha)d)$, with $T=\exp(-2\alpha_0 d)=50\%$ and $2(\delta\alpha)d$ approximated as $0.2(1-R_{F-P})$, proportional with the light absorbed in the sample. It can be seen that, the nonlinear loss at resonant (near 1540 nm) is 7 times larger than that at anti-resonant.

In one preferred embodiment, the gain medium is an erbium doped fiber having an upper state lifetime on the order of milliseconds (ms), and the round trip cavity time is typically 10–100 nsec. By using an R-FPSA with a large nonlinear loss, the fiber laser may operate in a QSML regime rather than a cw modelocked regime. In this case, it may be necessary to suppress the intense Q-switched pulses, thereby driving the laser below threshold. In a preferred embodiment of this invention, a two photon absorber (TPA) is used for this purpose to complement the R-FPSA, so that the laser operates in a cw modelocked regime. The TPA preferably has little or no single photon absorption at the laser wavelength. Thus, two different types of absorbers, having different nonlinear behavior, may be used in the same device to achieve self-starting, cw modelocked behavior.

The different intensity dependencies of a preferred saturable absorber (InGaAsP) and a preferred two photon absorber (InP) are illustrated in FIG. 4. The loss due to the two photon absorber increases strongly as a function of intensity, whereas the loss due to the saturable absorber decreases (saturates) with increasing intensity. The resultant "V-shaped" total loss of FIG. 4 has a minimum which is a favorable regime for cw modelocking.

The optical limiter (e.g., the TPA) preferably has a large two photon absorption coefficient $\beta_2$, which is a function of the ratio of the material's band gap $E_g$ and the photon energy, $$\frac{h}{2\pi}$$

see, for example, E. W. Van Stryland, M. A. Woodall, H. Vanherzeele, and M. J. Soileau, "Energy band-gap dependence of two-photon absorption," Opt. Lett., 10, 490, 1985). FIG. 5 shows how the two photon coefficient scales with this ratio, which is given by (Stryland et al., supra):

$$\beta_2 = \kappa\left[\frac{(h/E_g-1))^{3/2}}{2\pi} \bigg/ \left(\frac{h/E_g}{2\pi}\right)^5\right]\bigg/n^2 E_g$$

Here $\kappa$ is a nearly material independent parameter. For a given laser wavelength, the band gap $E_g$ of the optical power limiter should be larger than the photon energy $$\frac{h}{2\pi},$$

so that maximum two photon absorption can be obtained without significant increase in the insertion loss. The band gap can be easily controlled by proper choice of the semiconductor material and/or its doping levels.

The TPA is effective at suppressing QSML regardless of its position in the laser cavity. For example, the TPA may adjoin the saturable absorber. Alternatively, the TPA and the saturable absorber may be located on opposite sides of the gain medium, or several TPAs may be used to reduce the thickness of the Fabry-Perot device, thereby offering greater design flexibility (in accordance with equation (4)).

Suppression of Q-switched pulses by two photon absorbers has been previously reported (see, for example, A. Hordvik, "Pulse stretching utilizing two-photon-induced light absorption", J. of Quantum Electronics, QE-6, 199 (1970) and V. A. Arsen'ev, I. N. Matveev, and N. D. Ustinov, "Nanosecond and microsecond pulse generation in solid-state lasers (review)", Sov. J. Quantum Electron, vol. 7 (11), 1321 (1978)). Also, semiconductor-based two photon absorbers have been used as optical power limiters to protect damage sensitive optics (see, for example, U.S. Pat. No. 4,846,561 to Soileau et al.).

The band gap of a two photon absorber lies well above the photon energy at the laser wavelength, so that single photon absorption is low at low intensities. At higher intensities, however, the production rate of carriers generated from the valance band to the conduction band increases. The absorption (1−T) from two photon effects is given by:

$$A_{TPA}=\beta_2 I d_{TPA}/(1+\beta_2 I d_{TPA}) \tag{6}$$

where $d_{TPA}$ is the thickness of the TPA material and $\beta_2$ is the TPA coefficient. (See, for example, E. W. Van Stryland, H. Vanherzeele, M. A. Woodall, M. J. Soileau, A. Smirl, S. Guha, and T. F. Boggess, "Two photon absorption, nonlinear refraction, and optical limiting in semiconductors", Opt. Engin., vol. 24, 613, 1985).

A two photon absorber tends to limit the pulse shortening of high intensity pulses, since pulse peaks are more strongly attenuated than the wings. Thus, the conventional understanding of the two photon absorption effect is that it degrades the performance of modelocked lasers (see, for example, A. T. Obeidat and W. H. Knox, "Effects of two-photon absorption in saturable Bragg reflectors in femtosecond solid-state lasers", OSA Technical Digest, 11, 130, Proceedings of CLEO' 97). In the high gain fiber laser disclosed herein, however, Q-switched modelocking is the main impediment to cw modelocking. Thus, the two photon absorber effectively suppresses QSML, thereby facilitating cw modelocking, which is not significantly affected by the two photon absorber. The result is that the intracavity use of one or more two photon absorbers permits a wider range of saturable absorbers to be used.

The combination of the R-FPSA and the TPA optical limiter disclosed herein provides an ideal nonlinear device for self-starting modelocking, since the R-FPSA provides quick pulse shortening due to its large saturable loss, and the optical limiter self adjusts the nonlinear loss to be within the cw modelocking stability region (FIG. 4). The TPA power limiter also provides effective damage protection for the saturable absorber. The intensity on the saturable absorber can be optimized by varying the spot size on the absorber, or by selecting R appropriately.

using equation (5).

Figure 6:
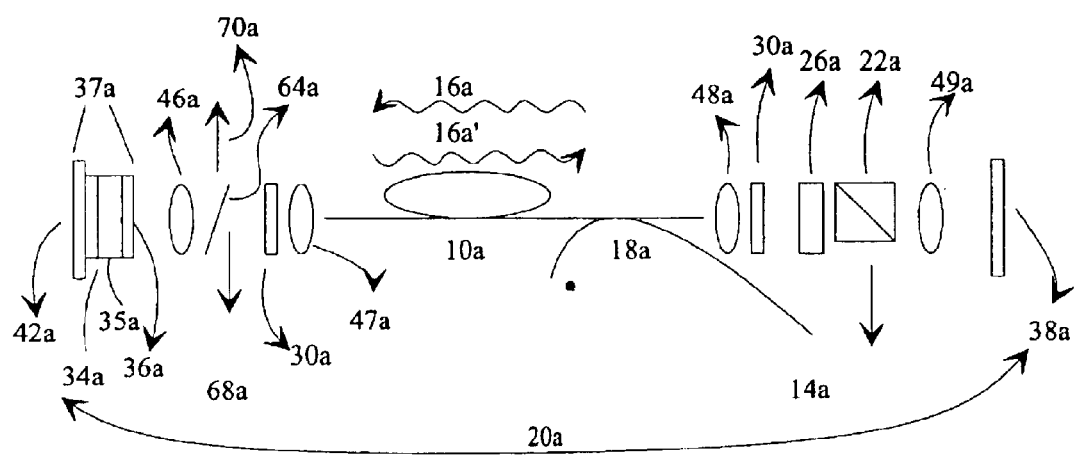

FIG. 6 illustrates one embodiment in which a saturable absorber (for inducing modelocking) and a two photon absorber (to inhibit Q-switching) are adjacent each other.

Figure 7:
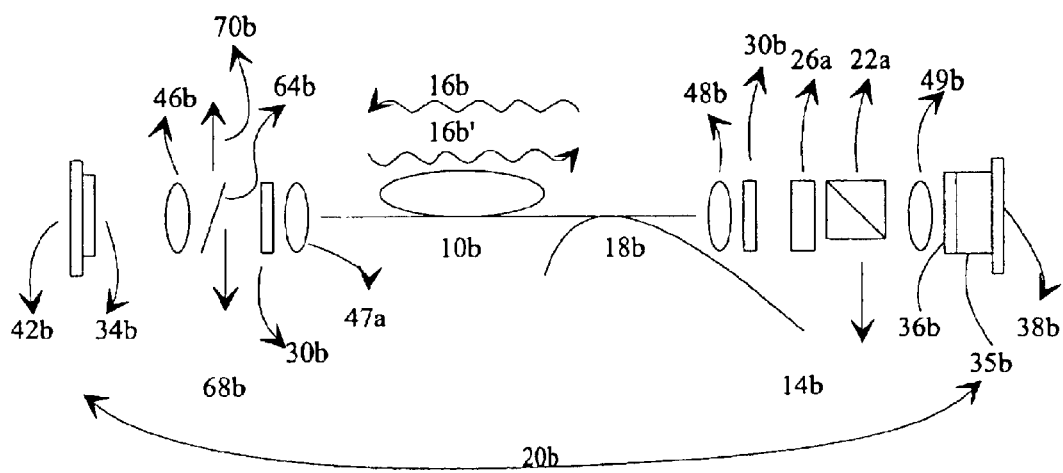

FIG. 7 illustrates another embodiment, which is similar to the one of FIG. 6, except that the saturable absorber and the two photon absorber are located at opposite ends of the laser cavity.

Figure 8:
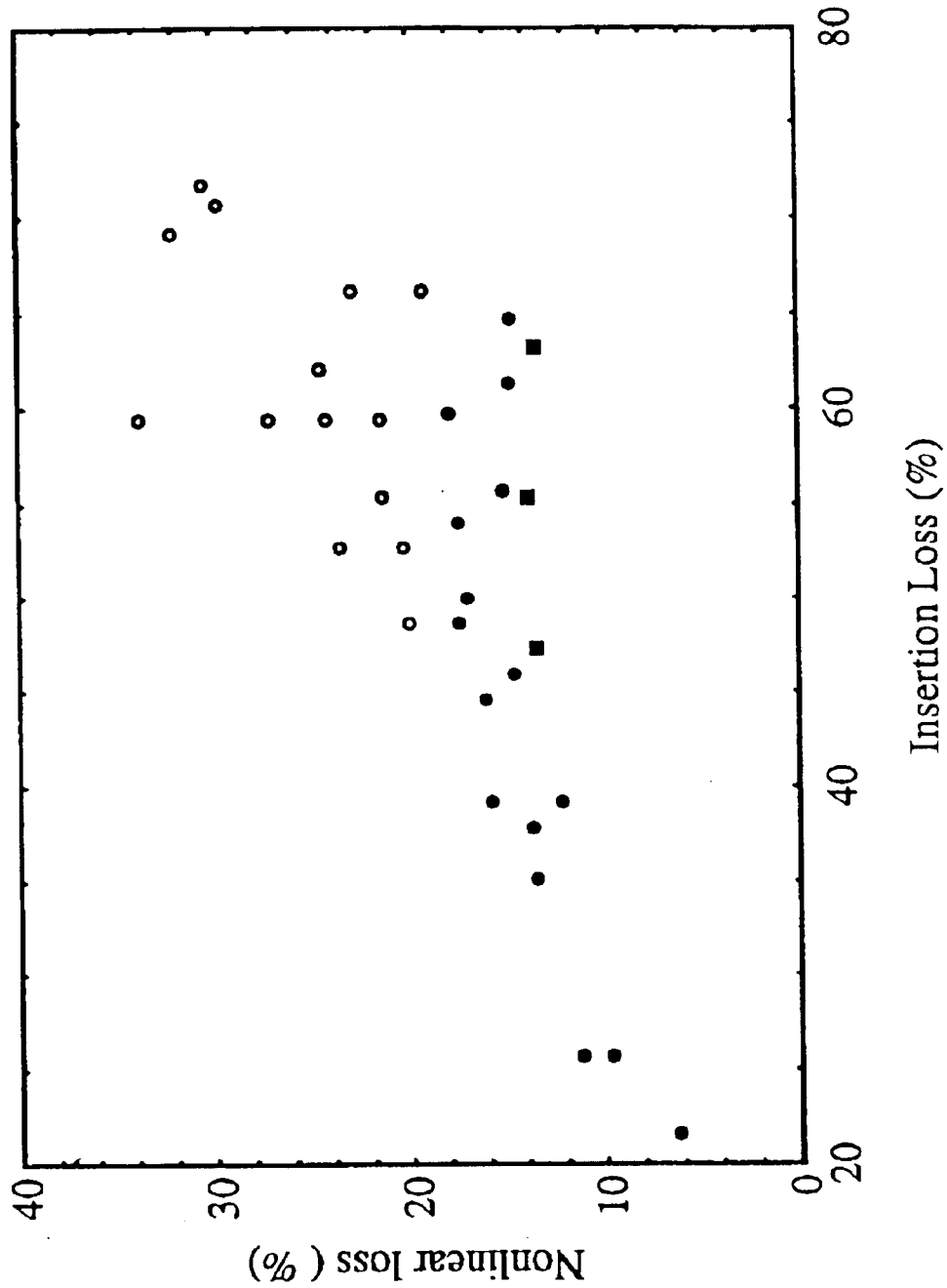

FIG. 8 illustrates how the negative nonlinear loss (measured using the pump-probe method with a fixed pump intensity) varies for various InGaAsP saturable absorbers with different insertion loss. Data points represented by the open circles and solid dots were made with samples taken from two different wafers. The square dots are AR-coated InGaAsP samples for which the InP wafer was not removed.

Figure 9:
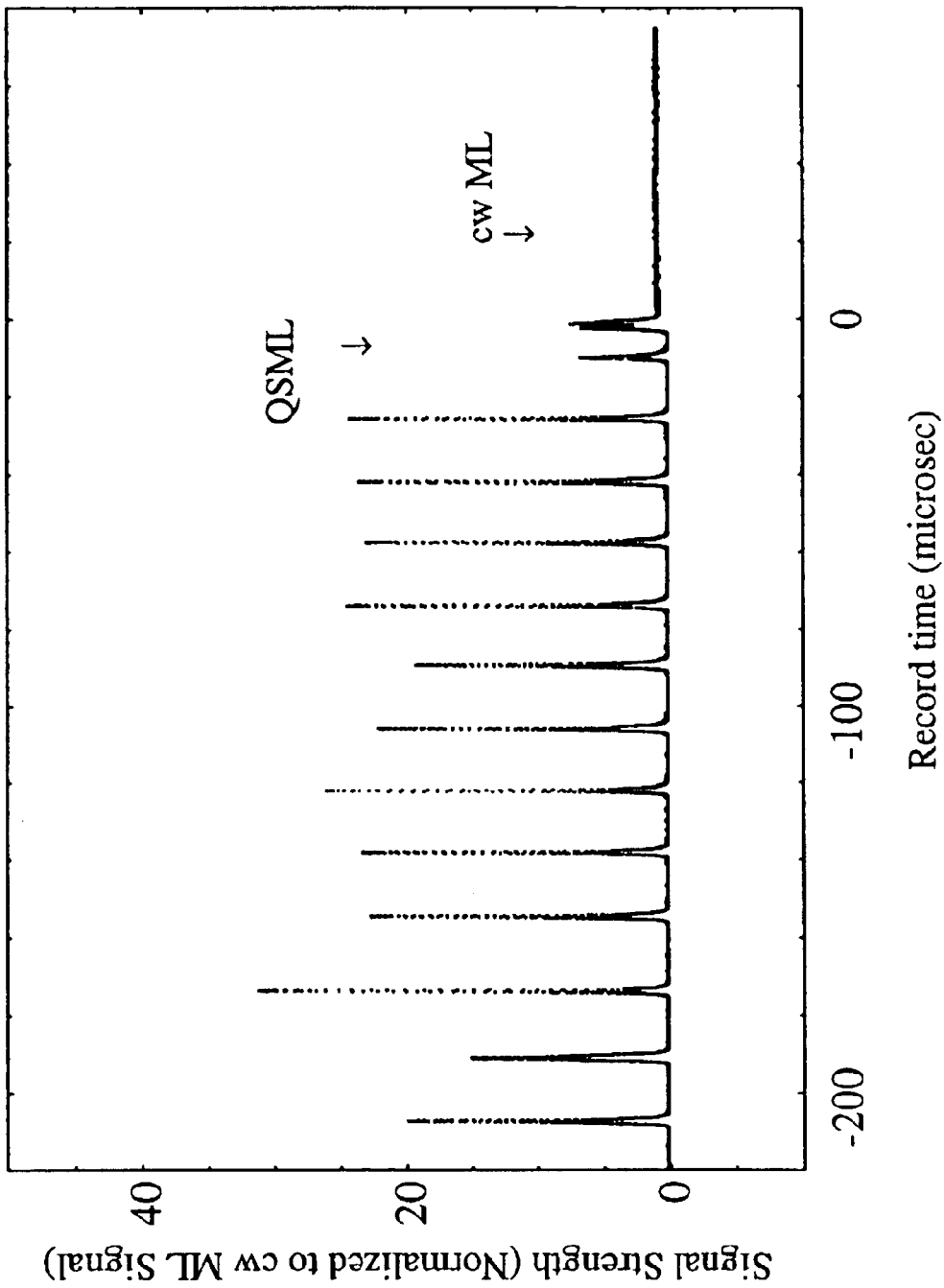

FIG. 9 shows the fiber laser output as a function of time, illustrating the evolution of Q-switched modelocking to cw modelocking. The signal strength is normalized to cw ML signal.

Figure 10:
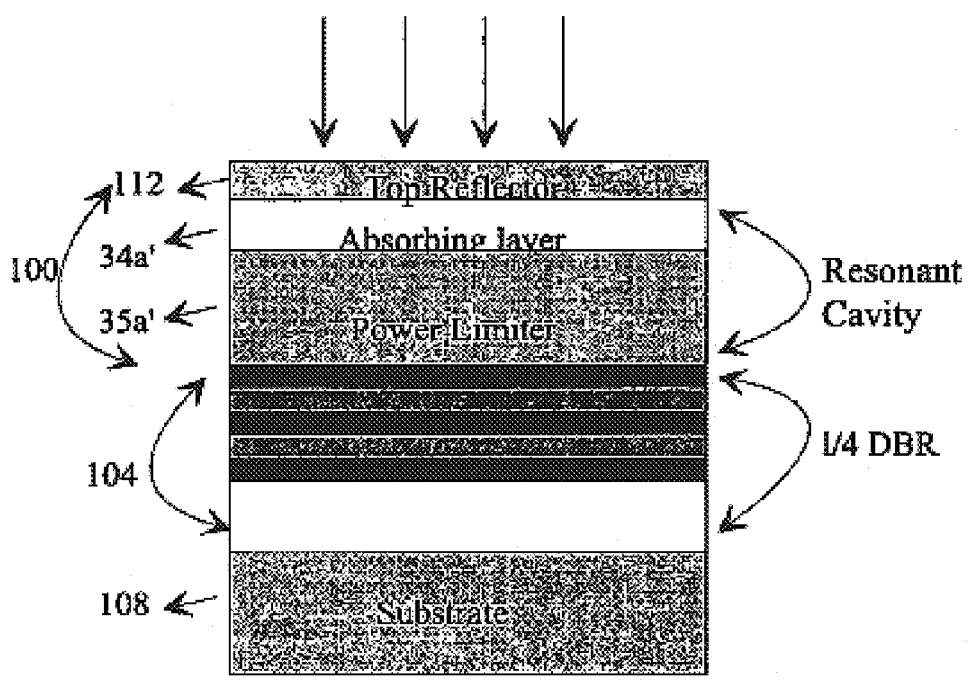

FIG. 10 is a schematic of a monolithic R-FPSA device to be used intracavity to generate cw modelocked pulses.

Figure 11:
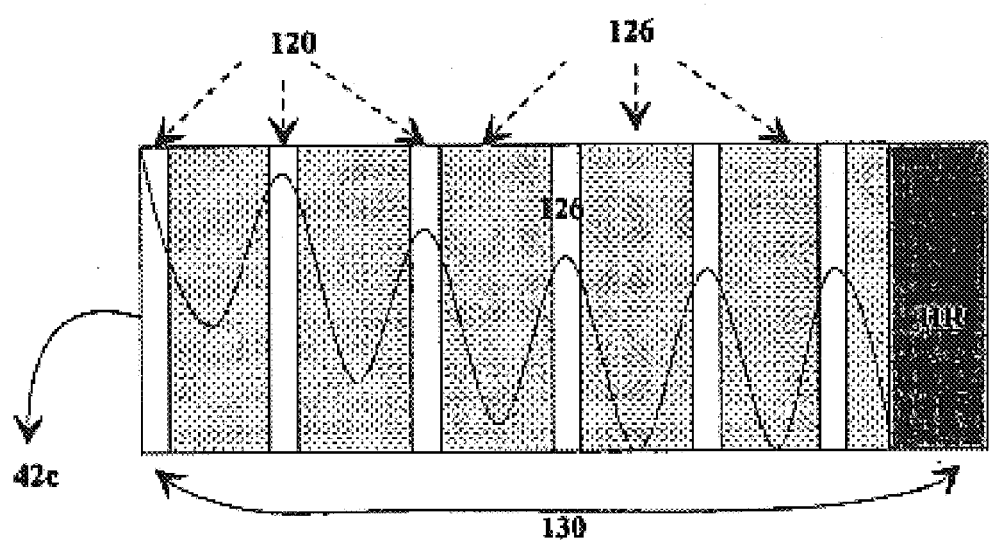

FIG. 11 is an embodiment for generating cw modelocked pulses in which absorbing layers are distributed at standing wave maximums. The sine-like curve represents the intensity distribution of the standing wave within the absorbing material.

DETAILED DESCRIPTION OF THE PREFERRED EMBODIMENT

In several preferred embodiments of this invention, self-starting cw mode-locking is obtained from Q-switched mode-locking. The cw mode-locking is induced by a near resonant Fabry-Perot saturable absorber (R-FPSA). An optical limiter such as a two photon absorber is preferably used in combination with the saturable absorber to self adjust the nonlinear loss to be within the stability region for cw mode-locking.

An Integrated Saturable Absorber (R-FPSA)/optical Power Limiter

A preferred embodiment of the invention is shown in FIG. 6, which includes a fiber gain medium 10a such as a 1.5 m length of $Er^{3+}$-doped optical amplifier fiber. The optical layout of this embodiment is similar in some respects to those disclosed in Assignee's co-pending U.S. application Ser. No. 09/040,252 filed Mar. 9, 1998 and entitled HIGH POWER, PASSIVELY MODELOCKED FIBER LASER, AND METHOD OF CONSTRUCTION, which is hereby incorporated by reference.

Pump light 14a (preferably from a laser source, which is not shown in the figures) with a wavelength near 980 nm is preferably directed into the erbium fiber 10a via a pump signal injector 18a (connected to the fiber), such as a wavelength-division multiplexer (WDM), as shown in the exemplary cavity 20a of FIG. 6. The pump light 14a optically excites erbium atoms in the fiber 10a. A polarizing element 22a such as a polarizing beam splitter cube or polarization beam splitter serves as the output coupler for a short pulse modelocked fiber laser signal 16a, 16a' (in which 16a and 16a' designate the leftward travelling and rightward travelling portions of the laser signal, respectively), and the respective orientations of waveplate 26a control the polarization evolution inside the cavity 20a and thus the level of output coupling. The laser signal 16a, 16a' results from stimulated emission of excited erbium. Two Faraday rotators 30a within the cavity 20a (i.e., proximate the ends of the cavity), which are preferably located on opposite sides of the fiber 10a, compensate for polarization drifts inside the cavity.

Although the embodiments of the present invention are discussed herein with respect to the erbium laser described above, other fiber gain media and laser configurations can be used. For example, the fibers may comprise other dopants (e.g., ytterbium, Thulium, Holmium, Neodymium, Praseodymium) and dopant concentrations, and different geometrical parameters can be used. Also, the laser configurations may include double clad fiber lasers, ring lasers, "FIG. 8" lasers, as well as other configurations common in the art.

In the exemplary cavity 20a, a saturable absorber 34a, which may have an insertion loss of about 30–70%, is located at one end of the cavity. The saturable absorber 34a is preferably InGaAsP attached to (i.e., disposed directly on) a reflector such as a partially or preferably totally reflecting mirror 42a, which together with a second highly reflecting mirror 38a (or reflector) defines the extent of (i.e., the ends of) the optical cavity 20a. The saturable absorber 34a induces modelocking of the laser signal 16a, 16a'.

An optical power limiter 35a (such as a two photon absorber) adjoining an AR coating 36a may optionally overlie the saturable absorber 34a to suppress Q-switching of the laser. The two photon absorber (TPA) 35a is preferably a 350 μm thick layer of InP. The reflectivity of the AR coating 36a is preferably small (i.e., <0.05%) to reduce optical interference effects. The mirror 42a, saturable absorber 34a, TPA power limiter 35a, and the AR coating 36a form an integral optical structure 37a.

The laser beam from the fiber 10a is collimated by a lens 47a and refocused by a lens 46a onto the saturable absorber 34a. The spot size on the saturable absorber may be adjusted by varying the position of the lens 46a and 47a or using lenses with different focal lengths. Other focusing lenses 48a and 49a in the cavity 20a aid in better imaging the laser signal 16a, 16a' onto the fiber 10a. The total intracavity fiber length within the cavity 20a is preferably 2 m, and the signal laser preferably operates at a repetition rate of 50 MHz. The resulting modelocked pulses are near bandwidth limited with a pulse width ranging from 300–600 fsec depending on the exact settings of the polarization controlling elements and the degree of output coupling. For an input pump power of 70 mW and optimized focusing on the saturable absorber 34a, the output coupling fraction can be varied between 50 and 80% and the laser will still exhibit self-starting cw modelocking behavior. When the output coupling fraction is tuned below the lower limit (i.e. <40%), multiple pulsing (more than one pulse per round trip) or cw components, along with the mode-locked pulses, are typically observed, depending on the insertion loss and the nonlinear loss experienced by the saturable absorber 34a.

A beam splitter 64a (with a reflectivity of preferably 1–2%) may be inserted in front of the saturable absorber 34a to monitor the power of the beams incident on (16a, $P_{Inc}$) and reflected from (16a', $P_{Ref}$) the saturable absorber 34a The beamsplitter 64a outcouples fractions of the intracavity power designated by arrows 68a and 70a, which are proportional to $P_{Inc}$ and $P_{Ref}$, respectively.

Nonadjoining R-FPSA and Power Limiter

An alternative embodiment is shown in FIG. 7, in which numerals juxtaposed with the letter "b" are substantially similar to their "a" designated counterparts in FIG. 6. The embodiment of FIG. 7 differs from the one of FIG. 6 in that the TPA power limiter 35b and its AR coating 36b no longer adjoin the saturable absorber 34b, but rather the mirror 38b on the other side of the cavity 20b. The performance of the laser of FIG. 7 is nearly identical with that of FIG. 6.

Characterization of a Preferred Saturable Absorber: InGaAsP

A preferred saturable absorber is InGaAsP. A number of InGaAsP saturable absorber elements were fabricated and then characterized in terms of lifetime, loss, and laser performance. The results of these tests are described here.

1. Lifetime

The lifetime of the carriers in the InGaAsP saturable absorber 34a, 34b was measured, using the pump-probe method, to be about 20 ns. However, the InGaAsP samples used in these embodiments were proton bombarded to reduce the carrier lifetime to ~5 ps.

2. Nonlinear Loss

Two methods were used to determine the in situ, operating nonlinear loss $q_{op}$ experienced by the saturable absorber 34b, i.e., the difference between the loss of the saturable absorber under cw modelocked operation and at lasing threshold:

$$q_{op}=l(I \text{ at modelocking})-l(I \text{ at lasing threshold}) \quad (7)$$

The most straightforward approach is to monitor the outcoupled powers 64b and 68b to determine the ratio between $P_{Ref}$, the power reflected from the saturable absorber, and $P_{Inc}$, the power incident on the saturable absorber, at both lasing threshold (relatively low intracavity power) and under modelocked conditions. $P_{Ref}/P_{Inc}$ is simply $R_{F-P}$, and $\Delta R_{F-P} = -\Delta F_{ABS} = -q_{op}$, in which $F_{ABS}$ is the fraction of the power incident on the saturable absorber 34b that is absorbed. Thus, measuring the change in $P_{Ref}/P_{Inc}$ between the lasing threshold case and modelocked operation directly gives the nonlinear loss $q_{op}$ experienced by the saturable absorber 34b.

In the second approach, the saturable absorber 34b (and the mirror 42b that underlies it) are first tested in an extracavity configuration using the pump probe method to determine the nonlinear loss q of the saturable absorber as a function of incident beam intensity, i.e., a calibration curve is constructed. In this technique, the nonlinear loss q is the change in $R_{F-P}$ of the probe beam (off of the saturable absorber 34b) in the limit of zero time delay from the pump beam. Next, the saturable absorber 34b to be tested (and its mirror 42b) are introduced into a laser cavity like that shown in FIG. 7. The intracavity power ($P_{Inc}$, 16b) is monitored by measuring the power outcoupled in the direction indicated by the arrow 68b. Once the intensity on the saturable absorber 34b is in hand, the nonlinear loss q can be determined from the calibration curve. Although the results of these two methods are consistent with each other, the second method gives more accurate results.

3. Laser Performance

Laser performance was studied as a function of saturable absorber loss to establish a working range over which the laser displays self-starting cw modelocking behavior. For a fixed intensity, the nonlinear loss of a saturable absorber may vary significantly as is shown in FIG. 8, for which the data were measured using the pump-probe method for a given pump beam intensity. The nonlinear loss of the saturable absorber 34b under modelocking conditions was determined for a number of different saturable absorbers using the methods described in the above section.

Values of $|q_{op}|$ of approximately 15% resulted in satisfactory cw modelocking performance with respect to self-starting behavior, and perturbation stability. For still lower values of $|q_{op}|$, self-starting becomes difficult. The performance of saturable absorbers having low $|q_{op}|$ under low intensity conditions can usually be improved by increasing the intensity on the saturable absorber until $|q_{op}|$ is increased up to, for example, the 15% level. As discussed previously, the intensity on the saturable absorber can be increased through either tighter focusing or by decreasing the output coupling fraction. For saturable absorbers providing very high nonlinear loss ($|q_{op}|>20\%$) due to, for example, the choice of band gap, only Q-switched mode-locking as opposed to cw modelocking was observed.

The maximum output coupling fraction consistent with self-starting modelocking behavior decreases with decreasing insertion loss for a given spot size, or alternatively, increasing spot size for a given insertion loss. For all of the saturable absorbers studied, the best performance results were obtained when the spot size on the saturable absorber was as small as possible without damaging it.

Evolution of Cw Modelocking from Q-switched Modelocking (QSML)

A fast detector and a digital oscilloscope were used to record the evolution of laser pulses from the embodiment of FIG. 6. These results are indicated in FIG. 9 and are a temporal illustration of how Q-switched modelocking evolves into cw modelocking. Similar results were obtained with the configuration of FIG. 7. The peak power of most of the Q-switched pulses can be a factor of 30 greater than that of the cw modelocked pulses. However, a couple of relatively lower power Q-switching pulses usually precede the transition to cw modelocking, with cw modelocking evolving out of the tail of one of the QSML pulses.

The pulse width of the Q-switched mode-locking pulses was measured with an auto-correlator to be less than 3 ps. To do this, the laser is deliberately set to the QSML regime by tuning the output coupling.

Exemplary Embodiments Including a TPA

The optical limiters of this invention are preferably made from semiconductors with a large two photon absorption coefficient. Although the embodiments and results in herein are described primarily with respect to InP/InGaAsP materials, other semiconductor materials may be employed. For applications near 1.55 μm, InP, InGaAsP, GaAs, AlGaAs may be suitable for use as the TPA power limiter. At shorter wavelengths, ZnS, CdSe, CdS, and CdTe can be used as TPAs. Sophisticated material engineering techniques, such as doping (which creates intermediate states), low temperature growth, quantum confinement, and lattice mismatch may also be employed to enhance the TPA effect, thereby producing a strong optical limiter.

Figure 1:
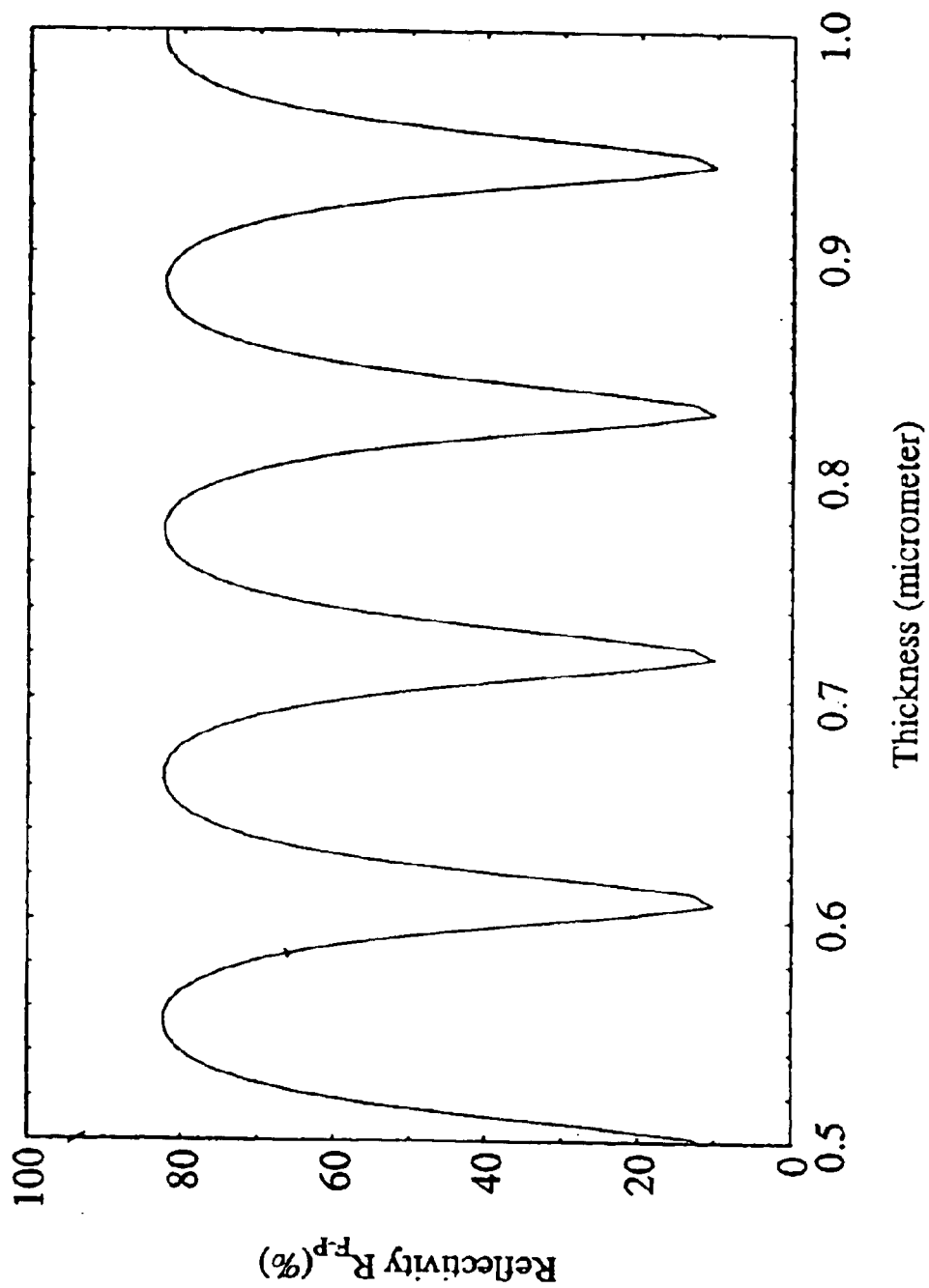
FIG. 1 shows the thickness dependence of the reflectivity ($R_{F-P}$) of a Fabry-Perot device for a laser wavelength of 1550 nm. The curve is calculated using equation (4) with R=30% and T=50%.
Figure 2:
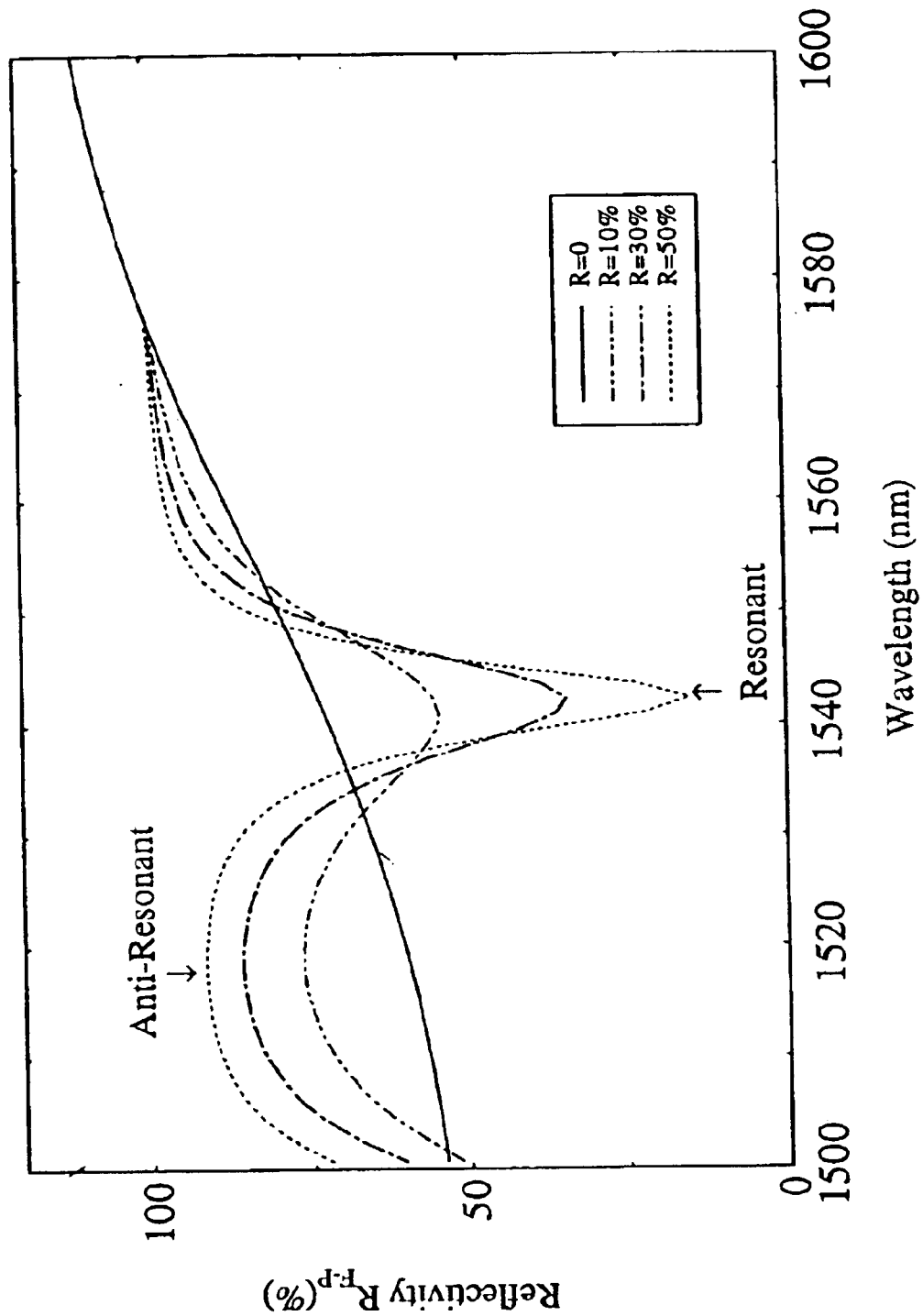
FIG. 2 is a plot of $R_{F-P}$ as a function of wavelength for varying R. The thickness of the device is 6.5 μm, yielding a bandwidth (fill width at half maximum) of ~10 nm. The solid curve (R=0%) is indicative of the semiconductor's band structure with the band gap at 1550 nm. The dotted curves are calculated using equation (4) with the wavelength dependent T being given by the R=0% case.
Figure 3:
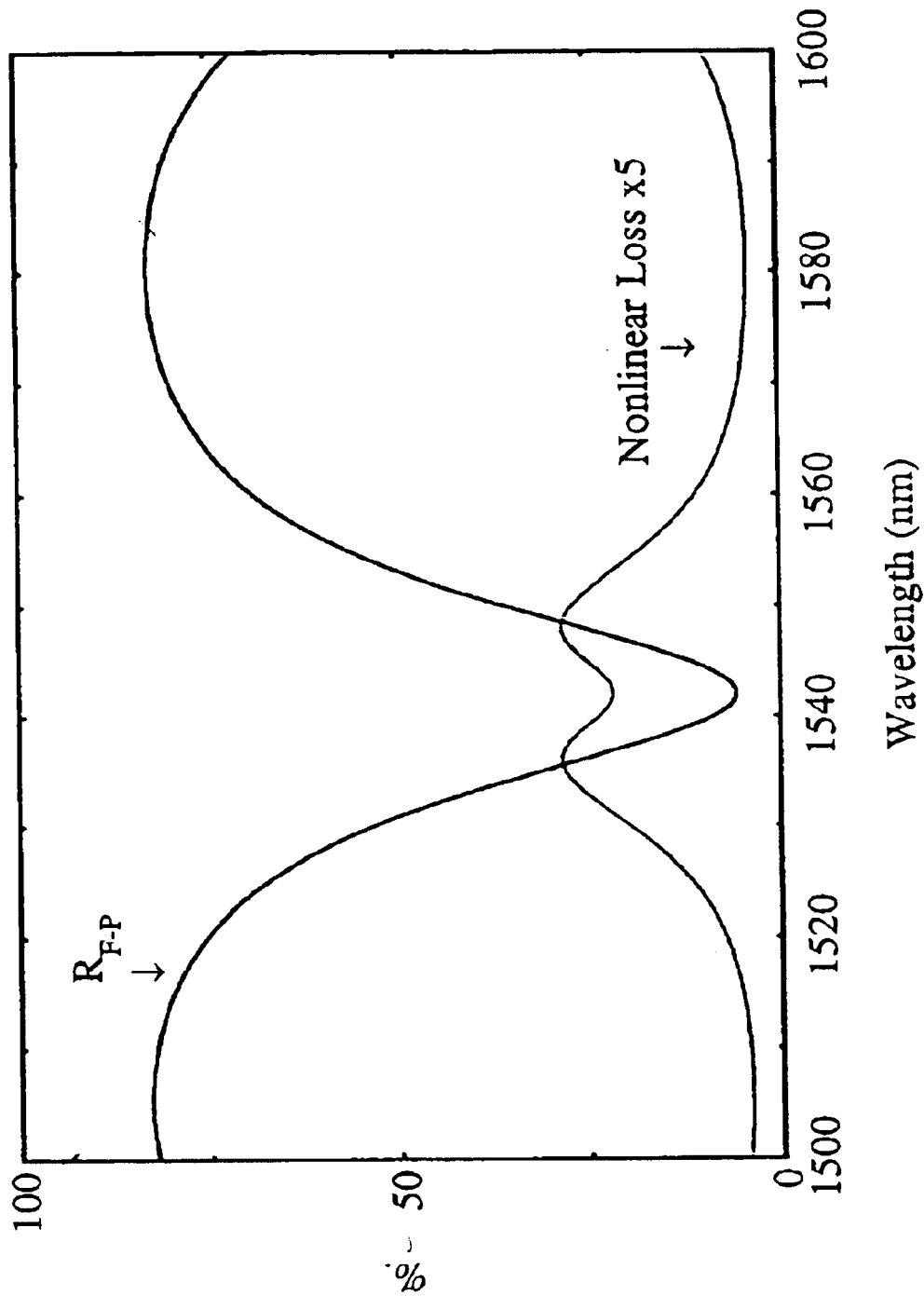
FIG. 3 shows $R_{F-P}$ as a function of wavelength, calculated using equation (4) with $T=T_0$=50% and R=30% The nonlinear loss is calculated as $-q=R_{F-P}(R,T)-R_{F-P}(R,T_0)$. Where $T=T_0(1-2(\delta\alpha)d)$, with $2(\delta\alpha)d$ approximated as $0.2(1-R_{F-P})$.
Figure 4:
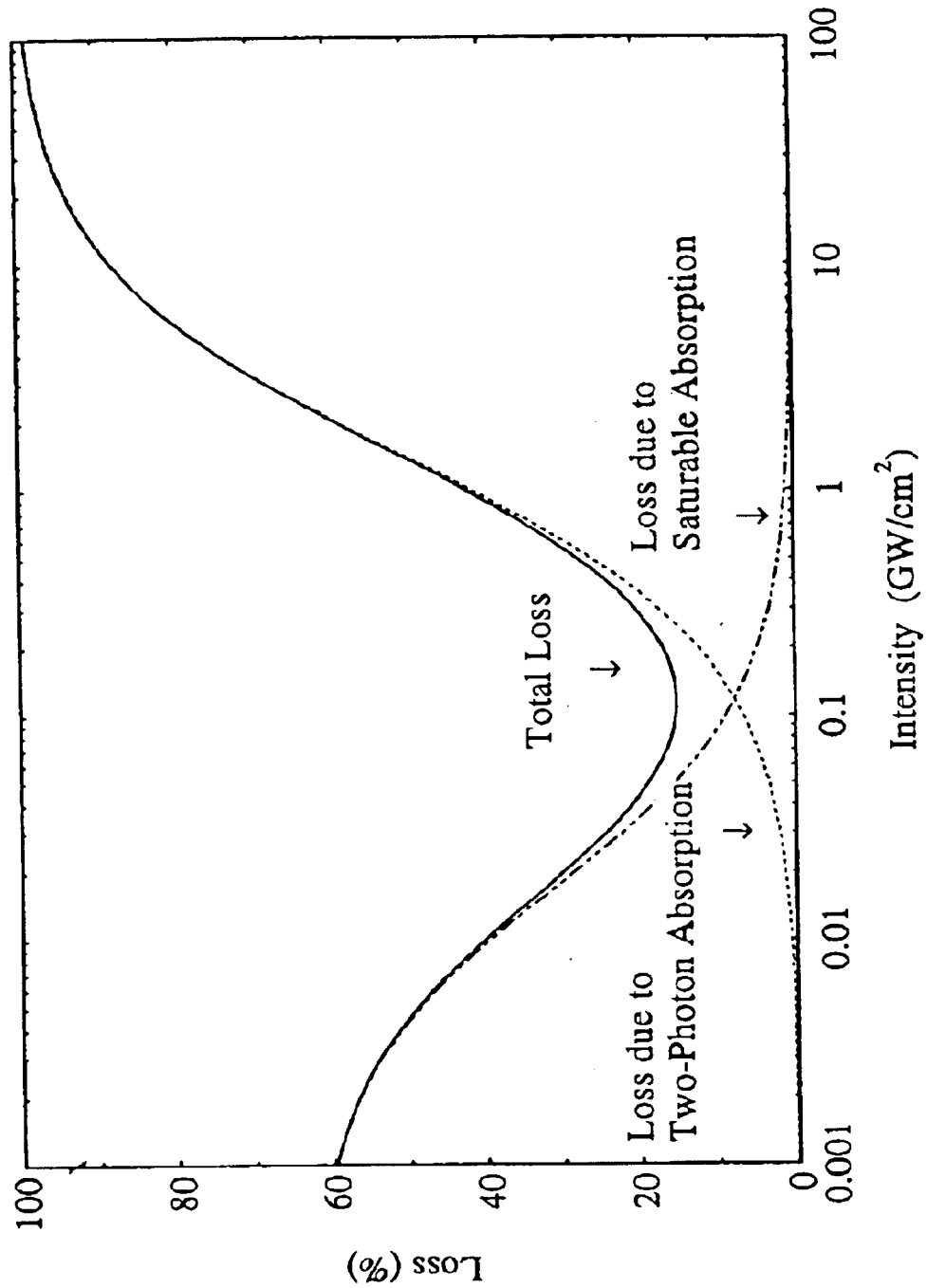
FIG. 4 illustrates the intensity dependence of loss due to saturable absorber, loss due to a two photon absorber, and their sum. The loss due to the saturable absorber is given by equation (1), with a being given by equation (2).
Figure 5:
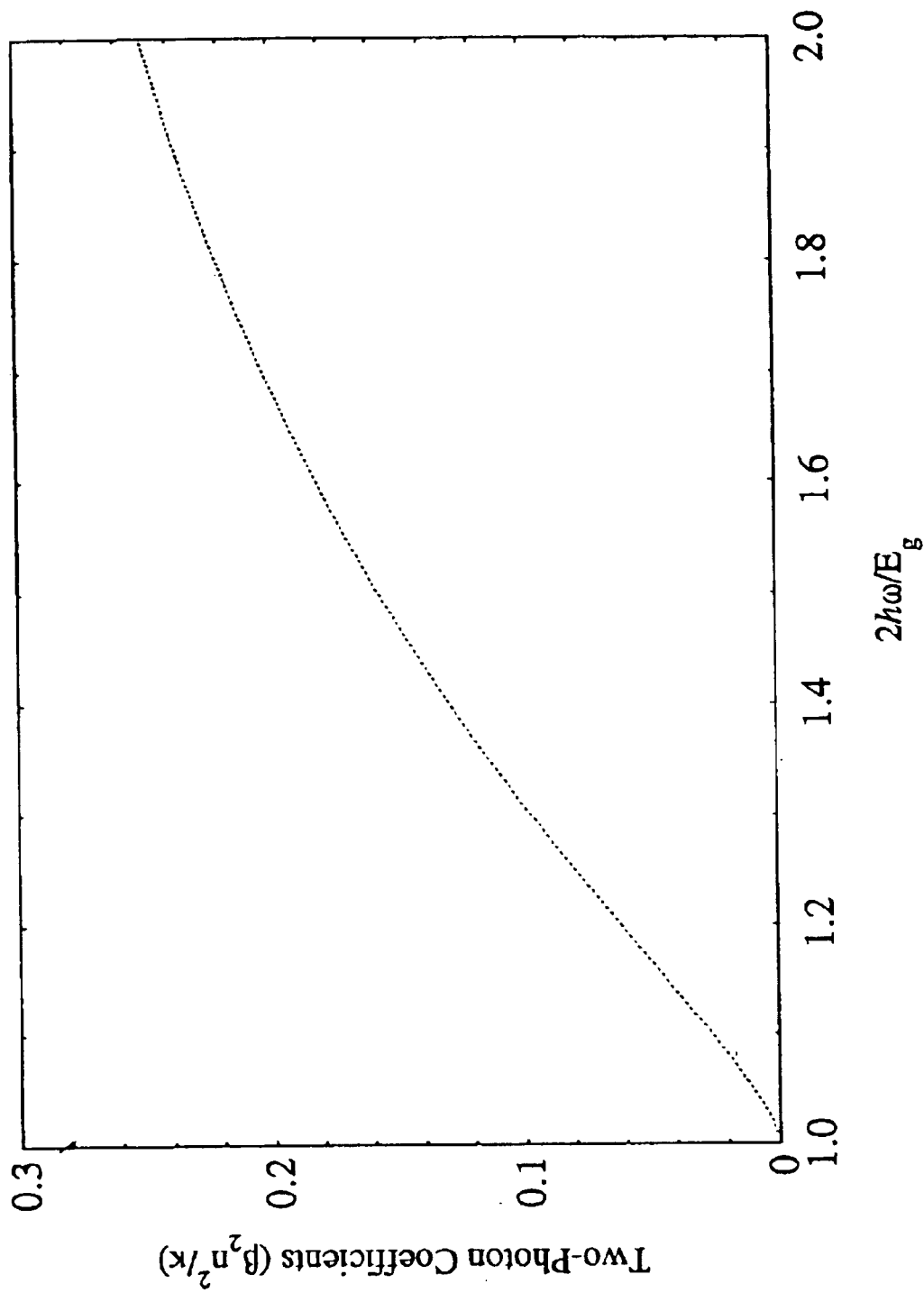
FIG. 5 shows how the two photon coefficient varies as a function of $$\frac{h/E_g}{2\pi}$$

One preferred two photon absorber is InP, which may also serve as the substrate for InGaAsP, which is a preferred saturable absorber. As part of these studies, the two photon absorption loss of a 350 μm thick sample of InP was measured in an extracavity test setup (not shown), in which one side of the sample was AR-coated and the other side was coated with gold. The results were found to be in excellent agreement with the theoretical values presented in FIG. 4. Also, the two photon absorption coefficient was determined to be 18 cm/GW, which is in good agreement with theoretical values. The nonlinear loss of the TPA sample was determined to be 50% at an intensity of approximately 0.2 GW/cm$^2$. Under very tight focusing conditions (spot size approx. 20 μm$^2$), optical damage was observed at the AR coated surface for intensities on the order of 10 GW/cm$^2$, which is much higher than the peak intensity of the QSML pulses (1 GW//cm$^2$) of the fiber laser disclosed herein.

The effect of the TPA power limiter was studied in different experimental configurations and the cw modelocked laser performance was then compared with that when the TPA is absent. In one embodiment, as shown in FIG. 6, a 350 μm layer of InP, the substrate, was left on the top of the ~0.75 μm InGaAsP absorber layer. The InP side surface is AR-coated and the InGaAsP side surface is HR coated. The insertion loss from the saturable absorber layer 34a for these tests was about 45% These results were then compared with a modification to this embodiment, in which the InP layer 35a and its AR coating 36a were not used. The laser provided nearly identical performance regarding the output power, wavelength, self-starting and stability against perturbation, compared to when the InP layer 35a was removed. For the configuration represented by FIG. 6, the spot size on the absorber 34a was varied from between 12 and 5 microns, but no damage to the saturable absorber was observed even for the highest possible pump power (70 mW).

Another set of comparisons was performed using the embodiment of FIG. 7. In FIG. 7, the InP two photon absorption layer 35b and the saturable absorber 34b are located on opposite ends of the cavity 20b. In this configuration, the performance of the laser is analyzed both with the InP wafer inside the cavity and InP wafer removed. When the InP layer 35b is removed from the cavity, the saturable absorber 34b was easily damaged during QSML when the 980 nm pump diode power is more than 60 mW at a spot size of ~12μm (diameter). With the InP layer 35b and 36b in the cavity, no damage on the InGaAsP saturable absorber 34b was observed for the highest possible pump level (~70mW) and with a spot size as small as ~8μm. For the embodiment of FIG. 7, the peak intensities of the QSML pulses was also monitored during the startup process of the mode-locking (similar to that in FIG. 9). We found that with the InP wafer in the cavity, the peak intensity of the QSML pulses is reduced to ⅕ of that when the InP is absent. In general, the use of an optical power limiter such as a two photon absorber reduces the peak power of optical pulses, hence, effectively protecting the saturable absorber from damage.

Since an optical limiter such as a two photon absorber does introduce some additional loss, a decrease in the cw modelocked output power can also be expected. Indeed, the outcoupled cw modelocked power from the configuration of FIG. 7 was about 5% less than that of the same laser but with the InP (35b and 36b) removed from the cavity for a pulse energy of approximately 0.2 nJ.

As the above discussion suggests, the use of a TPA optical power limiter permits greater latitude in designing and selecting a saturable absorber and reduces the possibility of damage to the saturable absorber. Because a TPA offers protection against optically or thermally induced damage, there is greater latitude in choosing the spot size on the saturable absorber, i.e., in varying the nonlinear loss. Further, the nonlinear loss of a TPA tends to force the fiber laser to operate in a cw modelocking regime.

Alternative Modelocking/power Limiting Embodiments

1. Distributed Bragiz Reflector as the High Reflector

A monolithic Resonant Fabry-Perot Saturable Absorber (R-FPSA) structure 100 that can be substituted for the optical structure 37a of FIG. 6 is illustrated in FIG. 10. This device preferably has a total thickness of 6.5 μm to provide a relatively wide bandwidth on the order of 50 nm. In this device, a quarter-wave distributed bragg reflector (DBR) 104 serves as the high reflector and preferably overlies (and may be grown on) a semiconductor substrate 108. A power limiter 35a' such as a TPA may adjoin the DPR 104, which in turn is preferably adjoined by a saturable absorber 34a'. A reflecting layer 112 preferably overlies the saturable absorber 37a' and acts as a partially reflecting surface. The reflectivity of the reflecting layer 112 may be chosen to give the operator greater freedom in choosing the tightness of the intracavity focusing. The saturable absorber 37a' and the power limiter 35a' function much like their unprimed counterparts of FIG. 6.

One design consideration with respect to the Fabry-Perot devices disclosed herein is that their free spectral range Δλ should be large compared to the bandwidth of the laser pulses. Thus, the total thickness of the absorbing layer plus any two photon absorbing layer is preferably limited to t=λ$^2$/2nΔλ. For example, if the desired Δλ is 50 nm at 1.5 μm, the thickness of the resonant cavity should be less than 6.5 μm for an index of refraction of ~3.5. On the other hand, for a given Fabry-Perot cavity thickness, the reflectivity R should be selected so that R$_{F-P}$ is preferably relatively flat over the laser gain profile, so that the lasing wavelength does not shift too far away from the gain peak.

The positions of the saturable absorber 34a' and the TPA layer 35a' may be exchanged to correspond with the ordering of the layers shown in FIG. 6. Further, in this and the other embodiments disclosed herein, the saturable absorber and the TPA may be positioned at any point in the optical device, and in fact, the TPA may be distributed throughout the device.

2. A Distributed Saturable Absorber and TPA

In the embodiment of FIG. 11, saturable absorber material 120 and optical limiting material 126 (e.g., a two photon absorber) are distributed throughout part of a laser cavity 20c, which is otherwise similar to its counterpart in FIG. 6. In this embodiment, the absorbing material 120 is preferably thin layers located at antinodal points of a Fabry-Perot cavity standing wave 130, with the TPA material 126 being used as a spacer between the thin absorbing layers. Since the fraction of light entering the device is a function of the front surface reflection, the amplitude of the standing wave formed inside the device depends on the front surface reflector 42c. In this situation, the standing wave is formed between the light propagating toward the back high reflector and that reflected by the back high reflector. The intensity on the absorbing layers 120, hence, can be controlled like the other R-FPSA devices disclosed herein.

3. Tunable Band Gaps

The saturable absorbers may be tuned to a limited extent by altering their effective band gap. This can done by changing the carrier injection rate through biasing, e.g., applying electrical leads to the saturable absorber. A similar technique has been used with vertical cavity surface emitting lasers (VCSELs). (See, for example, J. A. Hudgings, S. F. Lim, G. S. Li, W. Yuen, K. Y. Lau, and C. J. Chang-Hasinain, "Frequency tuning of self-pulsating in VCSEL with a voltage-controlled saturable absorber", OSA Technical digest 12, 10, OFC '98). Electrical signal from the electrical leads can also be used to monitor the photocurrent generated from optical pulses. Such signal can also be used for synchronization purposes.

4. Other Embodiments

In addition to the amplitude response of two photon absorbers (TPAs) discussed so far, TPAs also have a phase response, where the phase response arises from nonlinear changes in the refractive index of the TPAs. Semiconductor two photon absorbers are in general affected by the response of bound as well as free carriers. The response time of bound and free carriers can be quite different, ranging from about 300 fs for bound carriers to a range of ~1 ps-30 ns for free carriers. The amplitude response of semiconductor TPAs operating at laser frequencies above half band gap is mainly due to bound carriers, whereas the phase response is affected by bound as well as free carriers. Thus, the phase response of TPAs can have a very much longer lifetime compared to the amplitude response.

The nonlinear refractive index changes lead to self-focusing or defocusing; in a semiconductor operated well above half band gap, self-defocusing is typical. Self-defocusing as well as self-focusing lead to intensity-dependent changes of the divergence of the optical beams inside a laser cavity. The transmission through an aperture located somewhere inside the laser cavity can thus be adjusted to decrease as a function of intensity, and an effective optical limiting effect can hence also be obtained by the phase-response of the TPA. Note that in a cavity comprising a single mode fiber, the fiber itself provides such an aperture, and a cavity that comprises phase-response-induced optical limiting looks similar to either FIGS. 6 or 7 and is not separately shown.

Self-defocusing can also lead to a further optical limiting mechanism. This may be explained as follows. Let us assume an optical element where the TPA is integrated with the SA and a high reflector (HR), where the TPA is located in front of the SA and the adjacent HR, and let the whole structure be positioned at one end of a Fabry-Perot cavity as shown in FIG. 6. The intensity of the optical beam impinging onto the SA absorber can then be limited by self-defocusing in the TPA, which leads to an increase in the beam diameter on the SA with an increase in intensity.

Moreover, since the TPA-induced index changes can be relatively long-lived and comparable to the cavity round-trip time, the amount of self-defocusing can accumulate from pulse to pulse leading to a further enhancement of the optical limiting effect in a Q-switched mode-locked laser.

It should be understood that the scope of the present invention is not limited by the illustrations or the foregoing description thereof but rather by the appended claims, and certain variations and modifications of this invention will suggest themselves to one of ordinary skill in the art.

What is claimed is:

1. A cw mode-locked laser, comprising:
   an optical cavity;
   a gain medium within said optical cavity;
   a mode-locking element disposed within said cavity; and
   a two photon absorber disposed within said cavity.

2. A mode-locked laser, as defined in claim 1, wherein said two photon absorber induces cw mode-locked laser pulses.

3. A mode-locked laser as defined in claim 1, wherein said two photon absorber comprises InP.

4. A cw mode-locked laser, comprising:
   an optical cavity;
   a gain medium within said optical cavity;
   a saturable absorber disposed within said cavity, said saturable absorber having nonlinear absorption characteristics and inducing mode-locked laser pulses; and
   a Q-switching suppressor disposed within said cavity.

5. A cw mode-locked laser, comprising:
   an optical cavity supporting a cw mode-locked signal;
   a gain medium within said optical cavity for amplifying said cw mode-locked signal;
   a mode-locking element disposed within said cavity; and
   a two photon absorber disposed within said cavity.

6. A mode-locked laser, as defined in claim 5, wherein said two photon absorber induces cw mode-locked laser pulses.

7. A mode-locked laser as defined in claim 5, wherein said two photon absorber comprises InP.

8. A cw mode-locked laser, comprising:
   an optical cavity supporting a cw mode-locked signal;
   a gain medium within said optical cavity for amplifying said cw mode-locked signal;
   a saturable absorber disposed within said cavity, said saturable absorber having nonlinear absorption characteristics and inducing mode-locking of said cw mode-locked laser pulses; and
   a Q-switching suppressor disposed within said cavity.

* * * * *